(12) United States Patent
Lai et al.

(10) Patent No.: US 9,921,675 B2
(45) Date of Patent: Mar. 20, 2018

(54) TOUCH DEVICES, DRIVING METHODS THEREFOR, ARRAY SUBSTRATES, AND LIQUID CRYSTAL DISPLAY PANELS

(71) Applicants: Xiamen Tianma Micro-Electronics Co., Ltd., Xiamen (CN); Tianma Micro-Electronics Co., Ltd., Shenzhen (CN)

(72) Inventors: Qingjun Lai, Xiamen (CN); Huimin Xie, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 77 days.

(21) Appl. No.: 14/965,781

(22) Filed: Dec. 10, 2015

(65) Prior Publication Data
US 2016/0328060 A1    Nov. 10, 2016

(30) Foreign Application Priority Data

May 8, 2015 (CN) .......................... 2015 1 0232560

(51) Int. Cl.
| | |
|---|---|
| G06F 3/041 | (2006.01) |
| G06F 3/044 | (2006.01) |
| G02F 1/1333 | (2006.01) |
| G06F 1/32 | (2006.01) |
| G09G 3/00 | (2006.01) |

(52) U.S. Cl.
CPC ........ *G06F 3/0412* (2013.01); *G02F 1/13338* (2013.01); *G06F 1/3262* (2013.01); *G06F 3/044* (2013.01); *G06F 3/0416* (2013.01); *G09G 3/00* (2013.01)

(58) Field of Classification Search
CPC .. G02F 1/13338; G06F 1/3262; G06F 3/0412; G06F 3/0416; G06F 3/044
See application file for complete search history.

(56) References Cited

U.S. PATENT DOCUMENTS

| | | | |
|---|---|---|---|
| 2008/0062148 A1 | 3/2008 | Hotelling et al. | |
| 2008/0174851 A1* | 7/2008 | Kawai ................. | G02F 1/13624 359/296 |
| 2012/0062510 A1* | 3/2012 | Mo ........................ | G06F 3/044 345/174 |
| 2012/0127111 A1* | 5/2012 | Edwards ................. | G06F 3/044 345/174 |

(Continued)

FOREIGN PATENT DOCUMENTS

| | | |
|---|---|---|
| CN | 103197819 A | 7/2013 |
| CN | 103543870 A | 1/2014 |

(Continued)

*Primary Examiner* — Viet Pham
(74) *Attorney, Agent, or Firm* — Faegre Baker Daniels LLP

(57) ABSTRACT

A touch device includes a plurality of touch electrodes and a touch circuit. The touch electrodes are respectively connected with a plurality of interfaces on the touch circuit by touch detection lines and a switch is provided on the touch detection line corresponding to each of at least one of the touch electrodes. The switch has a first work state in which the switch is turned on and a second work state in which the switch is turned off.

19 Claims, 6 Drawing Sheets

(56) References Cited

U.S. PATENT DOCUMENTS

| | | | |
|---|---|---|---|
| 2013/0181942 A1* | 7/2013 | Bulea | G06F 3/044 345/174 |
| 2013/0285971 A1* | 10/2013 | Elias | G06F 3/044 345/174 |
| 2013/0329347 A1* | 12/2013 | Kuo | H03K 17/962 361/679.01 |
| 2014/0192005 A1* | 7/2014 | Wakuda | G06F 3/041 345/173 |
| 2015/0069362 A1* | 3/2015 | Ito | H01L 27/323 257/40 |
| 2015/0070604 A1* | 3/2015 | Chen | G06F 3/044 349/12 |
| 2015/0077650 A1* | 3/2015 | Huang | G06F 3/044 349/12 |
| 2015/0145821 A1* | 5/2015 | Kim | G06F 3/0412 345/174 |
| 2015/0220174 A1* | 8/2015 | Mu | G06F 3/044 345/174 |
| 2016/0216811 A1* | 7/2016 | Yang | G06F 3/0412 |

FOREIGN PATENT DOCUMENTS

| | | |
|---|---|---|
| CN | 104298410 A | 1/2015 |
| CN | 104503627 A | 4/2015 |
| WO | 2015051586 A1 | 4/2015 |

* cited by examiner

TOUCH DEVICES, DRIVING METHODS THEREFOR, ARRAY SUBSTRATES, AND LIQUID CRYSTAL DISPLAY PANELS

CROSS-REFERENCE TO RELATED APPLICATION

This application claims priority to Chinese Application No. 201510232560.4, filed May 8, 2015, which is herein incorporated by reference in its entirety.

TECHNICAL FIELD

The present disclosure relates to the field of touch sensing technology and, in particular, to touch devices, driving methods for the touch devices, array substrates, and liquid crystal display panels.

BACKGROUND

Currently, among others, a display panel having a touch sensing function has become a dominant display product. So far, a touch panel may be integrated with a display panel in various manners, obtaining an in-cell display panel, an on-cell display panel and an add-on type display panel. Further, depending on their operation principles, the display panels having the touch sensing function include a capacitive touch display panel, a resistive touch display panel, an infrared touch display panel and so on. The capacitive touch display panels include a self-capacitive touch display panel and a mutual-capacitive touch display panel. In the self-capacitive touch display panel, electrodes configured for the touch sensing function are typically disposed in an outer substrate of the display panel, thus the self-capacitive touch display panel has a small overall thickness and a light weight.

SUMMARY

The present disclosure provides touch devices, driving methods for the touch devices, array substrates and liquid crystal display panels. A switch is provided on the touch detection line corresponding to the touch electrode, and the work state of the switch controls the work state of the touch device. In the case of detection of touch, the work state of the switch is adjusted to control the number of the touch sensing electrodes for detecting a touch. When fewer touch electrodes work, the total capacitance of the touch electrodes is smaller, thereby improving the speed of detecting the touch.

In order to implement the design described above, the present disclosure adopts the following technical solutions.

In one example, a touch device is provided, including a plurality of touch electrodes and a touch circuit; wherein the touch electrodes are respectively connected with a plurality of interfaces on the touch circuit by touch detection lines; and a switch is provided on the touch detection line corresponding to each of at least one of the touch electrodes; wherein, the switch has a first work state in which the switch is turned on and a second work state in which the switch is turned off.

In another example, a driving method for the touch device is provided, including:
determining whether to switch the switch to the first work state or the second work state;
turning on the switch if determining to switch the switch to the first work state, so that the touch circuit outputs a touch driving signal to a touch detection line corresponding to the switch turned on; and
turning off the switch if determining to switch the switch to the second work state, so that the touch circuit stops outputting the touch driving signal to the touch detection line corresponding to the switch turned off.

In another example, an array substrate is provided, including any one of the touch devices described above, wherein, the touch electrodes of the touch device are divided from a common electrode of the array substrate.

In another example, a liquid crystal display panel is provided, including a color filter substrate and the array substrate described above.

The disclosure has at least one of the following beneficial effects: a switch is provided on the touch detection line corresponding to the touch electrode, and the work state of the switch controls the work state of the touch device. In the case of detection of touch, the work state of the switch is adjusted to control the number of the touch sensing electrodes for touch. When fewer touch electrodes work, the total capacitance of the touch electrodes is smaller, thereby improving the speed of the detection of the touch.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of the embodiments of the disclosure, the drawings used for the description of the embodiments of the disclosure are briefly introduced below. Obviously, the drawings for the following description only show some embodiments of the disclosure, and other drawings may also be obtained from the described drawings.

Figure 1:
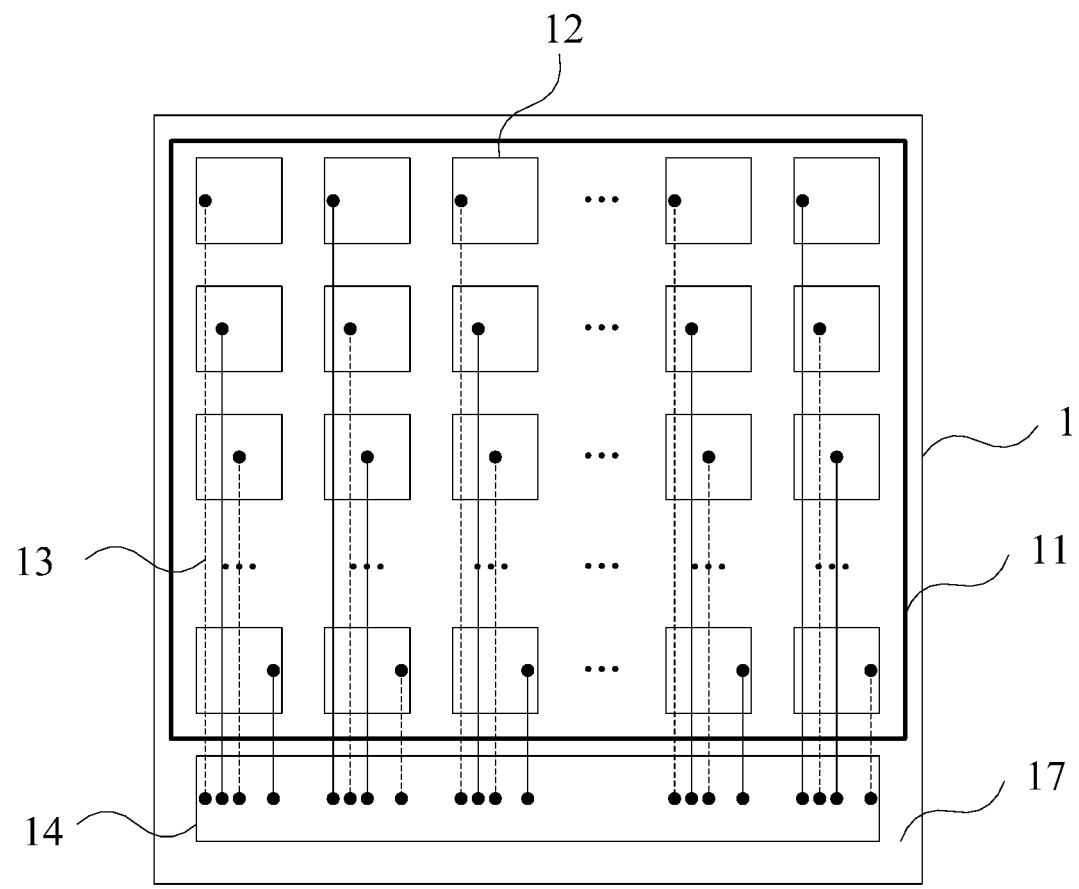
FIG. 1 is a schematic diagram showing an arrangement of switches in a touch device, according to embodiments of the disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solutions of the disclosure are clearly and completely described below with reference to the accompanying drawings in combination with the embodiments of the disclosure. Obviously, merely some instead of all embodiments of the disclosure are described herein. All other embodiments obtained in light of the described embodiments of the disclosure should fall within the scope of the disclosure.

FIG. 1 is a schematic diagram showing the arrangement of switches in a touch device, according to embodiments of the disclosure. As shown in FIG. 1, the touch device includes a plurality of touch electrodes 12 and a touch circuit 14.

The touch electrodes 12 are respectively connected with a plurality of interfaces on the touch circuit 14 by touch detection lines 13, and a switch is provided on the touch detection line 13 corresponding to each of at least one touch electrode 12. The switch has a first work state and a second work state, where the switch is turned on under the first work state, and is turned off under the second work state.

Due to the arrangement of the switches with the first work state and the second work state, a work state of the touch device depends on the work states of the switches, and particularly, the work state of the touch device depends on the ratio of effective touch electrodes. For example, under a normal work state, a touch detection operation is performed by all of the touch electrodes 12; but under a low power consumption work state, the touch detection operation is performed by a portion of the touch electrodes 12. Accordingly, under the normal work state, all or most of the switches are in the first work state, but under the low power consumption work state, half of the switches or even more are in the second work state. Certainly, other configurations are possible, for example, it is possible that 60% of the switches are in the second work state under the low power consumption work state. As shown in FIG. 1, under the normal work state, the switches on the touch detection lines 13 represented by both solid lines and dashed lines are in the first work state; and under the low power consumption work state, the switches on the touch detection lines 13 represented by the solid lines are in the first work state and the switches on the touch detection lines 13 represented by the dashed lines are in the second work state, or the switches on the touch detection lines 13 represented by the dashed lines are in the first work state and the switches on the touch detection lines 13 represented by the solid lines are in the second work state. As such, under the low consumption work state, the touch circuit 14 sends touch driving signals to only a half of the touch electrodes 12, thus power consumption in the touch phase is decreased by half approximately.

In other embodiments, in order to further decrease power consumption, merely one touch electrode 12 from each group of touch electrodes 12 arranged as a 2×2 array is maintained in the effective state, or rows or columns of the touch electrodes 12 corresponding to the switches turned on alternate with rows or columns of the touch electrodes 12 corresponding to the switches turned off, under the low power consumption state. Further, it is possible that even fewer switches corresponding to the touch electrodes 12 are turned on to achieve lower power consumption under the low power consumption state, as long as the touch sensing function can be achieved. The size of the touch electrode 12 may vary with different product requirements and manufacturing processes. If the touch electrodes 12 each have a relatively big area, the proportion of the switches in the second work state cannot be high, otherwise a big region of the touch area of the touch device without touch electrodes 12 in the effective state is present and might cause a failure of the touch operation; on the contrary, if the touch electrodes 12 each have a small area, the proportion of the switches in the second work state can be higher, as long as a big region with consecutive touch electrodes 12 corresponding to the switches turned off is avoided.

Figure 2:
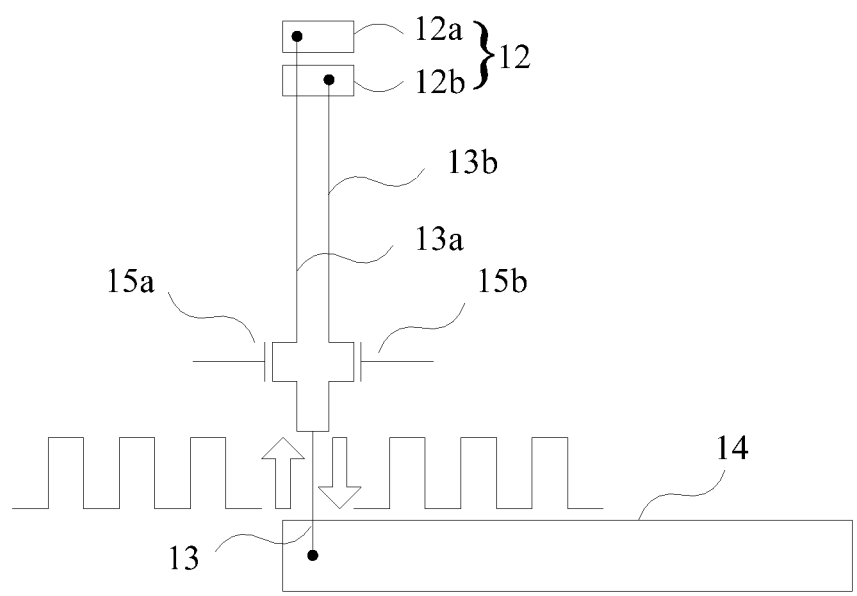
FIG. 2 is a schematic diagram showing another arrangement of touch electrodes and switches in a touch device, according to embodiments of the disclosure.

FIG. 2 is a schematic diagram showing an arrangement of touch electrodes and switches in a touch device, according to embodiments of the disclosure. The touch device is based on the touch device of FIG. 1, but at least one of the touch electrodes 12 includes at least two sub-electrodes 12a and 12b electrically insulated from each other, and the at least two sub-electrodes 12a and 12b are both connected with an interface (on the touch circuit 14) corresponding to the touch electrode 12, which includes the at least two sub-electrodes 12a and 12b, by the touch detection line 13, as shown in FIG. 2.

Here, each of the touch electrodes 12 includes two sub-electrodes 12a and 12b electrically insulated from each other.

Generally, the touch electrodes 12 are arranged in an array, and the touch circuit 14 for driving the touch electrodes 12 to detect a touch is disposed below the array. In the below description of the touch device, the arrangement of the touch circuit 14 below the array is used as a reference for distinguishing a row from a column, for distinguishing top from bottom, and for distinguishing left from right. In embodiments, the touch electrode 12 includes at least two sub-electrodes 12a and 12b electrically insulated from each other, each of the sub-electrodes 12a and 12b is connected with the interface corresponding to the touch electrode 12 via one touch detection line 13, and a switch is provided on the touch detection line 13 corresponding to each of at least one sub-electrode of the touch electrode 12. In this way, in touch detection under the low power consumption work state, the number of the sub-electrodes for the touch detection, i.e. the number of the sub-electrodes in the first work state, may be adjusted by the switches. If its sub-electrodes activated for the touch detection are reduced, the touch electrode 12 has a decreased capacitance, thereby improving the speed of the touch detection and decreasing power consumption. In particular, in the case of low battery in the device, if only one of the sub-electrodes of each touch electrode 12 is activated for the touch detection, the speed of the touch detection can be effectively improved and power consumption for the touch detection is decreased.

In comparison with the embodiments of FIG. 1, the arrangement of the sub-electrodes 12a and 12b can further ensure implementation of the touch sensing function. For example, given that each touch electrode 12 has an area of 1 unit and the sub-electrode has an area of ½ unit, in the embodiments of FIG. 1, if a half of the switches are turned off and thus a half of the touch electrodes 12 operate in the effective state, a half of the touch area of the touch device is idle in the touch detection, and the minimal idle region in the touch area has an area of 1 unit; while in the embodiments of FIG. 2, if half of the switches are turned off to deactivate one of two sub-electrodes 12a and 12b in each touch electrode 12, then still a half of the touch area of the touch device is idle in the touch detection, but the minimal idle region in the touch area has an area of ½ unit. In other words, in the embodiments of FIG. 2, an idle region with a big area will not occur, so that the touch detection is more stable. If the deactivated touch electrodes 12 (or sub-electrodes 12a and 12b) are distributed evenly in the embodiments of FIG. 1 and the embodiments of FIG. 2, it may happen that the touch signal is intensive but a failure of the touch detection occasionally occurs in the embodiments of FIG. 1, however, the touch sensing function can be well implemented although the touch signal from a single sub-electrode is less intensive in the embodiments of FIG. 2.

In the embodiments shown in FIG. 2, the normal work state and the low power consumption work state can be implemented as like in the embodiments of FIG. 1 in such a way that: switches 15a and 15b corresponding to one of any two adjacent touch electrodes 12 both are switched to the second work state and switches 15a and 15b corresponding to the other of the two adjacent touch electrodes 12 both are switched to the first work state, so that the implementation principle of the low power consumption work state is the same as that in the embodiments of FIG. 1.

Two sub-electrodes 12a and 12b of each touch electrode 12 are disposed symmetrically.

Optionally, two sub-electrodes 12a and 12b of each touch electrode 12 are disposed one above another.

Generally, each touch electrode 12 has two sub-electrodes 12a and 12b, so that the resultant product including such touch electrodes 12 is simple in structure and wiring, includes a low number of the switches, and may be manufactured in a simple production process, and further merely one of the switches corresponding to each touch electrode 12 needs to be operated in actual use. As such, the provision of two or more sub-electrodes of each touch electrode can implement the touch sensing function in a higher precision and meet various touch precision requirements for different work states.

In a variant, the two sub-electrodes 12a and 12b of the touch electrode 12 are not symmetrical. For example, one of the two sub-electrodes has a size which is ⅔ of the size of the touch electrode 12, and the other of the two sub-electrodes has a size which is ⅓ of the size of the touch electrode, where the former provides a more intensive touch signal than the latter.

In embodiments, the two sub-electrodes 12a and 12b of each touch electrode 12 are described as symmetrical.

In the embodiments as shown in FIG. 2, the touch electrode 12 includes two sub-electrodes, i.e. a sub-electrode 12a and a sub-electrode 12b, the touch detection line 13 corresponding to the touch electrode 12 includes a sub-detection line 13a and a sub-detection line 13b in parallel to each other and respectively connected with the sub-electrode 12a and the sub-electrode 12b, and a switch 15a and a switch 15b are provided. Such arrangement is also used in subsequent embodiments. The switches 15a and 15b are respectively connected with the sub-detection lines 13a and 13b. Under the normal work state of the touch device, the switches 15a and 15b both are in the first work state, so that a touch driving signal is sent by the touch circuit 14 to the sub-electrodes 12a and 12b via the sub-detection lines 13a and 13b, respectively, and touch sensing signals generated on the sub-electrodes 12a and 12b are transmitted over the sub-detection lines 13a and 13b, then combined on the touch detection line 13 and returned to the touch circuit 14. For touch detection in the case of low battery or a power saving mode of the touch device, one of the switches 15a and 15b is in the first work state, and the other is in the second work state, for example, the switch 15a is in the second work state, thus the sub-electrode 12a is not effective in the touch detection, but the sub-electrode 12b is used for detecting the touch in a region corresponding to the touch electrode 12. In comparison with the case that both the sub-electrode 12a and the sub-electrode 12b are simultaneously used to detect the touch, the touch detection by a single sub-electrode can be performed in an accelerated detection speed, since the capacitance of the touch electrode is reduced and charging time is accordingly shortened. Further, because the touch electrode 12 per se has a small area, the touch detection is not affected even though a half of the touch area is inactive in the touch detection.

Figure 3:
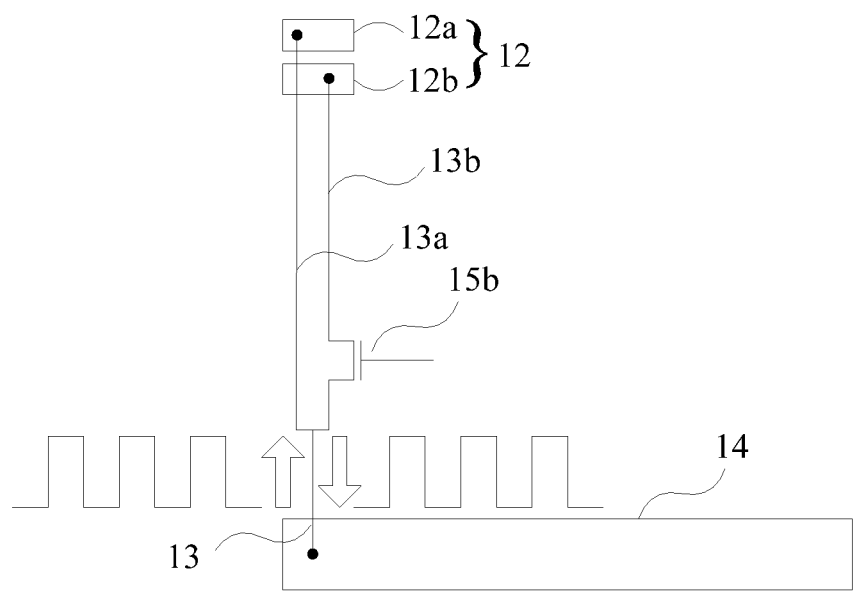
FIG. 3 is a schematic diagram showing another arrangement of touch electrodes and switches in a touch device, according to embodiments of the disclosure.

A solution shown in FIG. 3 also includes the sub-electrodes 12a and 12b disposed one above another, but differs from the solution in FIG. 2 in that only the sub-electrode 12b is provided with the switch 15b, and the sub-electrode 12a is always effective in the touch detection.

Optionally, two sub-electrodes 12a and 12b of each touch electrode 12 are distributed horizontally side by side.

Figure 4:
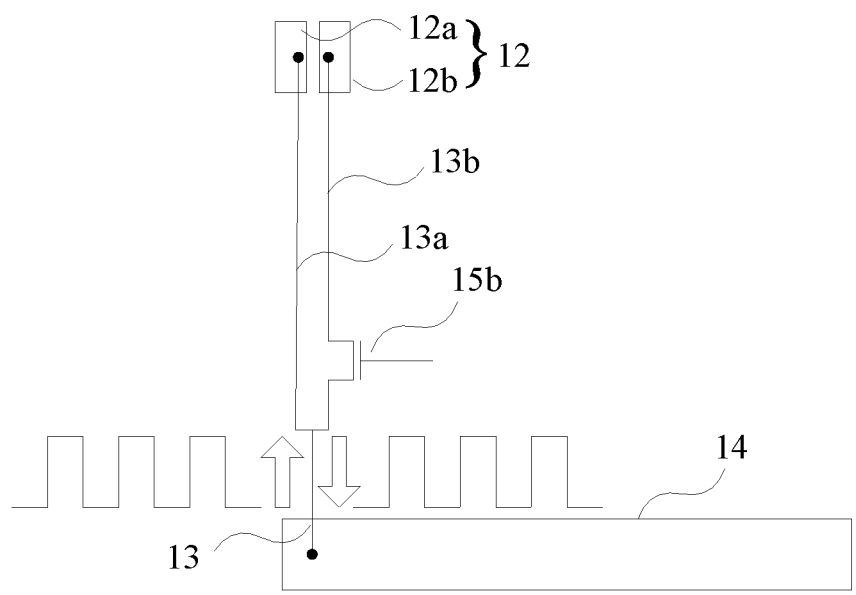
FIG. 4 is a schematic diagram showing another arrangement of touch electrodes and switches in a touch device, according to embodiments of the disclosure.

As shown in FIG. 4, the sub-electrodes 12a and 12b are distributed horizontally side by side. In the solution shown in FIG. 4, no switch is provided on the sub-detection line 13a, i.e. the sub-electrode 12a is always effective in the touch detection, and the switch 15b disposed on the sub-detection line 13b is configured to adjust the work state of the touch electrode 12. The specific work principle here is similar to that in the solution shown in FIG. 3, which is not described further here.

Optionally, two sub-electrodes 12a and 12b of each touch electrode 12 are distributed diagonally.

Figure 5:
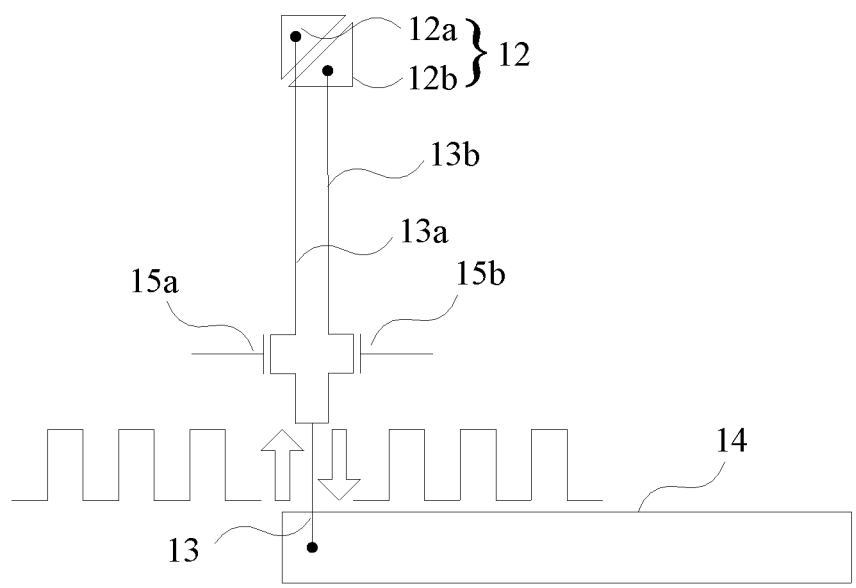
FIG. 5 is a schematic diagram showing another arrangement of touch electrodes and switches in a touch device, according to embodiments of the disclosure.

As shown in FIG. 5, the touch electrode 12 is divided into sub-electrodes 12a and 12b along its diagonal line, and the sub-electrodes 12a and 12b are connected to the switches 15a and 15b, respectively. In embodiments, alternatively, the control on the work state of the touch electrode 12 can be implemented by a switch connected with merely one of the sub-electrodes 12a and 12b. Additionally, for the touch electrode 12 in a square or rectangular shape, an opening around the center of the touch electrode 12 can divide the touch electrode 12 into two axisymmetric sub-electrodes having the same area. Therefore, the touch electrode 12 may be divided into two sub-electrodes 12a and 12b having the same size in various manners. Similarly, the touch electrode 12 of a rectangular shape can be divided into two sub-electrodes having the same area by an opening around the center of the touch electrode 12 in various manners.

Optionally, two sub-electrodes 12a and 12b of each touch electrode 12 are distributed one inside another.

Figure 6:
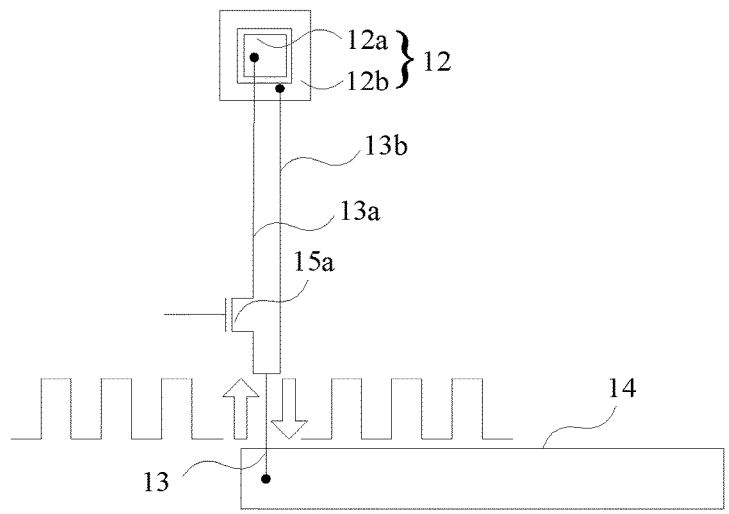
FIG. 6 is a schematic diagram showing another arrangement of touch electrodes and switches in a touch device, according to embodiments of the disclosure.

As shown in FIG. 6, the sub-electrodes 12a and 12b are distributed one inside another, and the inside sub-electrode 12a is connected with the switch 15a, or the outside sub-electrode 12b is connected with the switch, or both the sub-electrodes 12a and 12b are connected with switches.

Optionally, a switch is provided on the touch detection line 13 corresponding to each sub-electrode.

Optionally, a switch is provided on the touch detection line 13 corresponding to one of two sub-electrodes 12a and 12b of each touch electrode 12.

It has been illustrated in the foregoing that a switch is provided on the sub-detection line corresponding to each sub-electrode of the touch electrode or a switch is provided on the sub-detection line corresponding to only one of sub-electrodes of each touch electrode, for example, FIGS. 2 and 5 show the former case and FIGS. 3, 4 and 6 show the latter case.

Optionally, each touch electrode 12 employs the same distribution of sub-electrodes 12a and 12b.

If each sub-electrode 12 employs the same distribution of sub-electrodes 12a and 12b, for example, the sub-electrodes 12a and 12b are disposed one above another in FIG. 2, the sub-electrodes 12a and 12b are disposed horizontally side by side in FIG. 4, and so on, accordingly, the switches are distributed in the same manner, then the production process can be simplified by such uniform arrangement, and production costs can be decreased and the product yield can be improved because of mass production of uniform pieces.

Optionally, the switch is embodied as a thin film transistor.

If the switch is embodied as a thin film transistor, one of a source electrode and a drain electrode of the thin film transistor is connected with the sub-electrode 12, the other is connected with an interface of the touch circuit 14, and a gate electrode of the thin film transistor is applied with a level signal to control the thin film transistor to be turned on.

Figure 7:
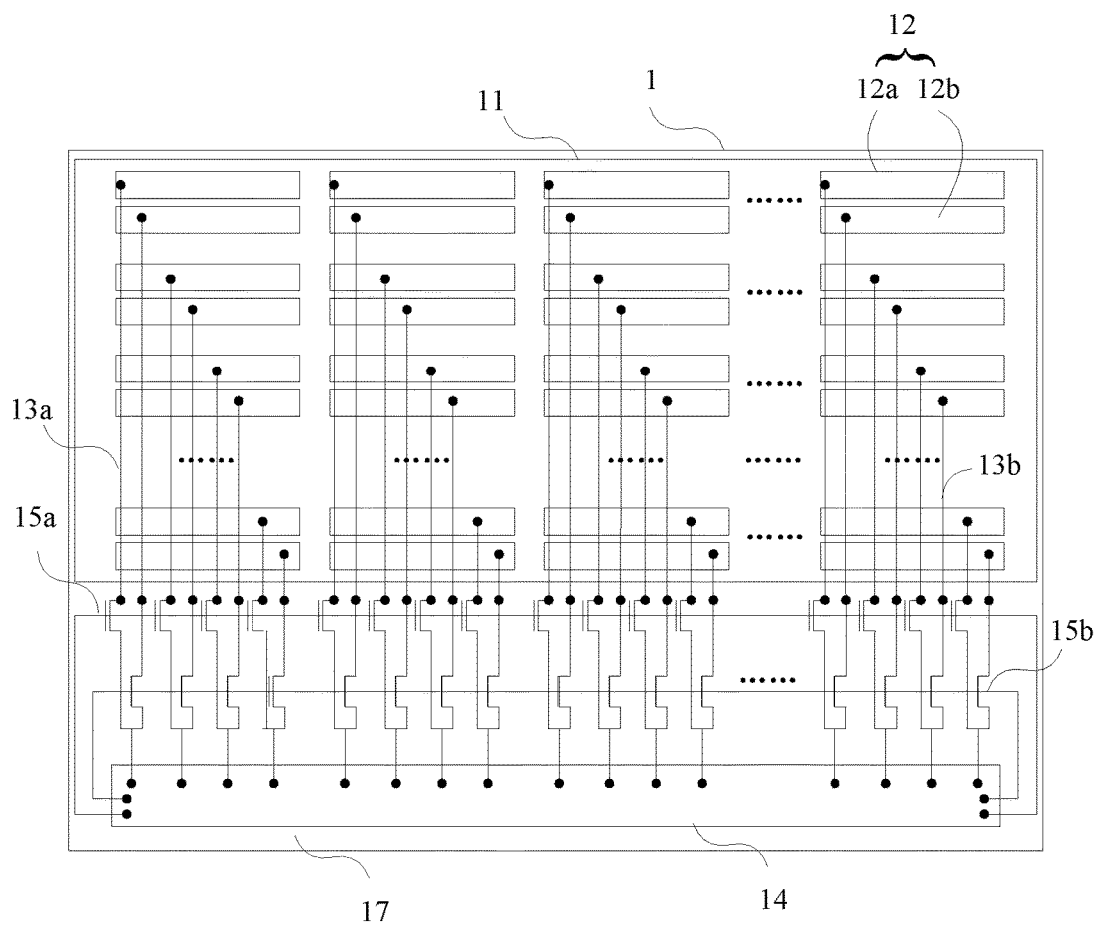
FIG. 7 is diagram showing an example of the overall structure of the touch device, according to embodiments of the disclosure.

FIG. 7 shows an example of the overall structure of the touch device. Each touch electrode 12 includes sub-electrodes 12a and 12b, a sub-detection line 13a corresponding to each sub-electrode 12a is connected with a switch 15a, and a sub-detection line 13b corresponding to each sub-electrode 12b is connected with a switch 15b. All of the switches 15a are electrically connected with a port of the touch circuit 14 for outputting a level signal, and all of the switches 15b are electrically connected with another port of the touch circuit 14 for outputting a level signal. Under the normal work state of the touch device, the switches 15a and 15b both are in the first work state. When the touch device enters the low power consumption mode, the touch circuit 14 sends out a signal to control all of the switches 15a or the switches 15b to switch to the second work state, so that only one of the sub-electrodes 12a and 12b of each touch electrode 12 is effective in the touch detection. If the touch electrodes 12 function as a common electrode in a display phase, all of the switches are turned on when the common electrode operates during the display phase.

Figure 8:
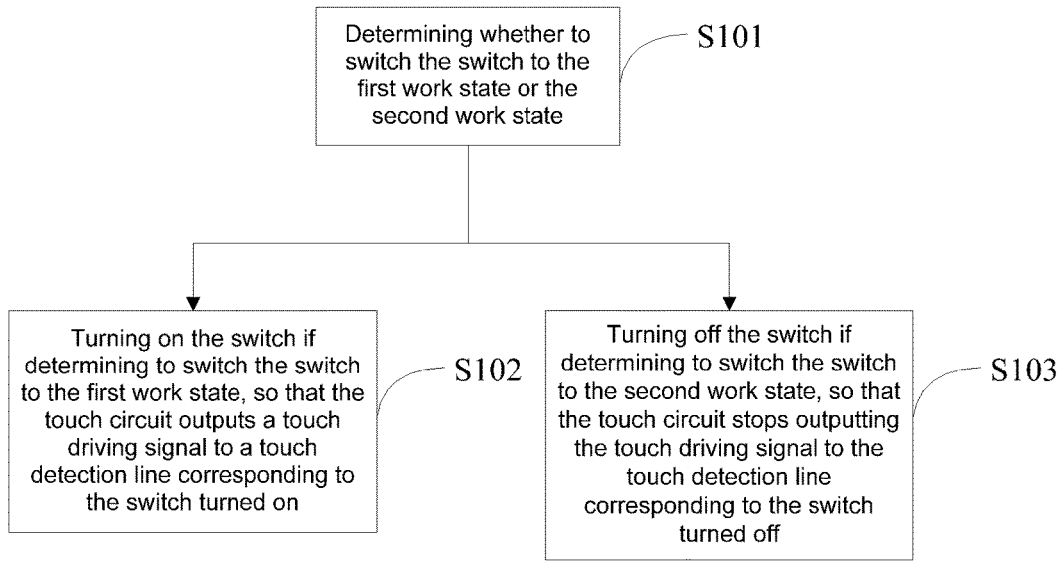
FIG. 8 is a flowchart of an implementation of a driving method for the touch device, according to embodiments of the disclosure.

Embodiments of the disclosure provide a driving method for the touch device described above, reference to the embodiments of the touch device described above may be made for omitted description of the driving method. FIG. 8 is a flowchart of a first implementation of a driving method for the touch device, according to embodiments of the disclosure. As shown in FIG. 8, the method includes:

step S101 of determining whether to switch the switch to the first work state or the second work state;

step S102 of turning on the switch if determining to switch the switch to the first work state, so that the touch circuit outputs a touch driving signal to a touch detection line corresponding to the switch turned on; and step S103 of turning off the switch if determining to switch the switch to the second work state, so that the touch circuit stops outputting the touch driving signal to the touch detection line corresponding to the switch turned off.

It is noted that the switch is individually turned on or off. For example, 70% or 80% of the switches are turned on in the first work state; turning off the switches in the second work state is described in comparison with the first work state, that is, at least a part of the switches turned on in the first work state are turned off in the second work state.

Figure 9:
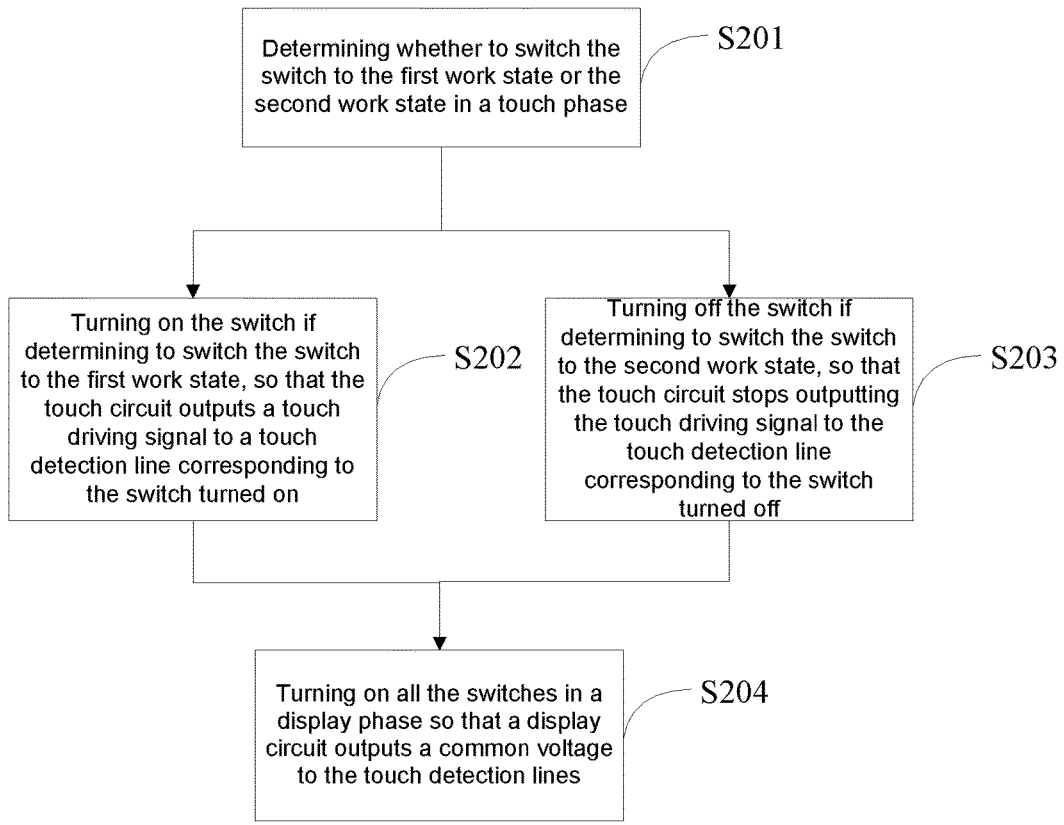
FIG. 9 is a flowchart of another implementation of a driving method for the touch device, according to embodiments of the disclosure.

FIG. 9 is a flowchart of a second implementation of a driving method for the touch device, according to embodiments of the disclosure. In the touch device, the touch electrodes are divided from the common electrode, and the touch detection lines function as connection lines to the common electrode. As shown in FIG. 9, the method includes:

step S201 of determining whether to switch the switch to the first work state or the second work state in a touch phase;

step S202 of turning on the switch if determining to switch the switch to the first work state, so that the touch circuit outputs a touch driving signal to a touch detection line corresponding to the switch turned on;

step S203 of turning off the switch if determining to switch the switch to the second work state, so that the touch circuit stops outputting the touch driving signal to the touch detection line corresponding to the switch turned off; and step S204 of turning on all the switches in a display phase so that a display circuit outputs a common voltage to the touch detection lines.

Embodiments of the disclosure provide an array substrate 1, including the touch device described above. The touch electrodes 12 of the touch device are divided from a common electrode of the array substrate 1, that is, a common voltage signal is applied to the touch electrodes 12 during the display stage to implement a display function of the array substrate 1, and touch driving signals are applied to the touch electrodes 12 during the touch stage to implement a touch sensing function of the array substrate 1.

The switches and the thin film transistors in the array substrate 1 for controlling the orientation of a liquid crystal are manufactured in the same manufacturing process.

Figure 10:
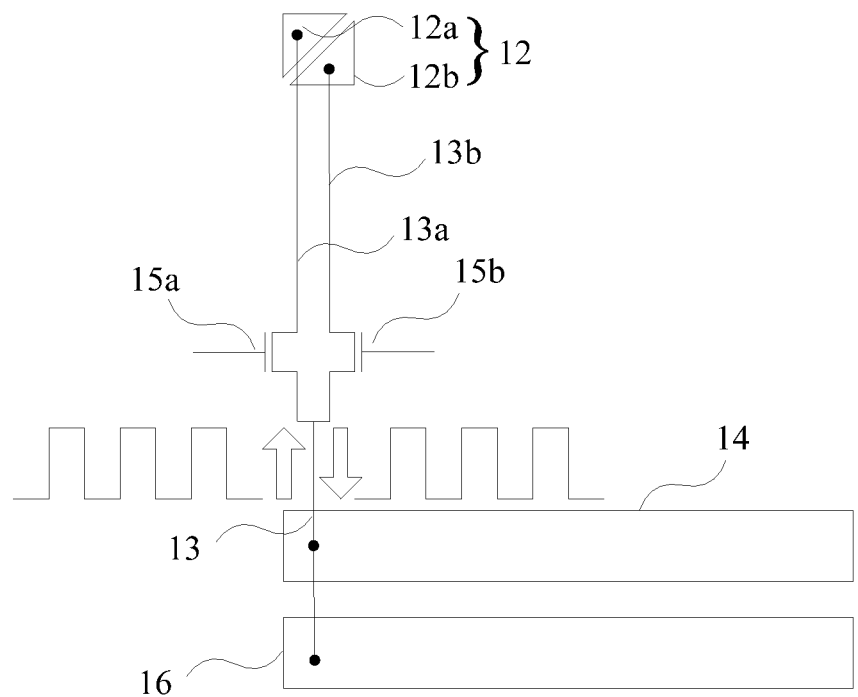
FIG. 10 is a schematic diagram showing the structure of an array substrate, according to embodiments of the disclosure.

Further, the touch detection line 13 may function as a connection line to the common electrode. As shown in FIG. 10, a touch circuit 14 and a display circuit 16 both are connected with the touch electrode 12 by the touch detection line 13, so that the touch electrode 12 is used by the touch circuit 14 and the display circuit 16 in a time-division manner. As such, the touch detection by the touch circuit 14 alternates with the application of the common voltage by the display circuit 16. The solution of dividing the common electrode into a plurality of the touch electrodes 14 is known in the related art, and is not further illustrated herein.

In the display phase, the display circuit 16 needs to drive the liquid crystal to rotate, thus the common voltage needs to be applied to the entire common electrode, that is, all sub-electrodes 12 must be in the effective work state, therefore, all switches are turned on.

Embodiments of the disclosure provide a liquid crystal display panel, including a color filter substrate 2 and the array substrate 1 described above.

An integrated circuit of the liquid crystal display panel is disposed in a non-display region 17 of the liquid crystal display panel, and is connected with the touch detection lines 13.

Figure 11:
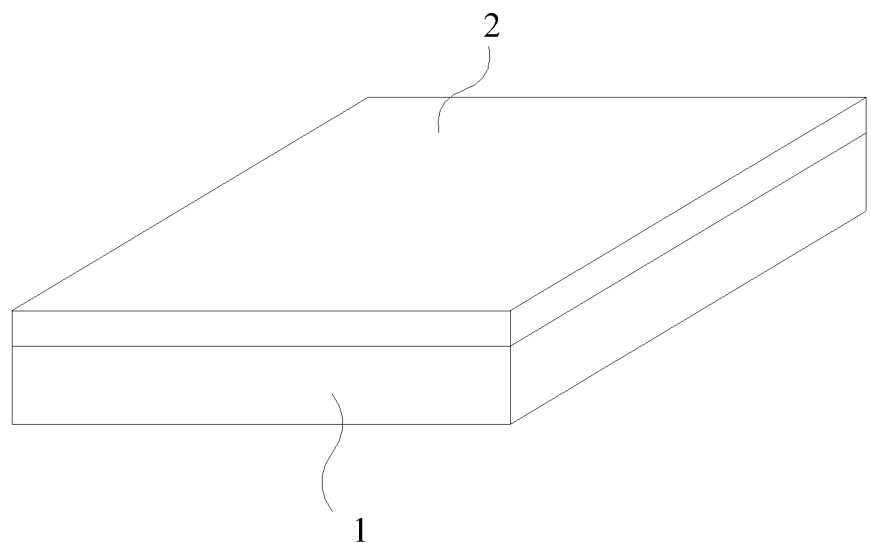
FIG. 11 is a schematic diagram showing the structure of a liquid crystal display panel, according to embodiments of the disclosure.

Referring to FIGS. 7, 10 and 11, the liquid crystal display panel includes a color filter substrate 2 and the array substrate 1 described above. The array substrate 1 includes a display region 11 and a non-display region 17, and a touch circuit 14, a display circuit 16 and other integrated circuits for implementing auxiliary functions are disposed in the non-display region 17. The non-display region 17 refers to a region of the array substrate 1 other than the display region 11.

Technical principles of the disclosure are described above in combination with embodiments. Those description are merely intended to explain the principles of the disclosure, but cannot be constructed as the limitation to the protecting scope of the disclosure. Based on the explanation described herein, other embodiments can be conceived and fall into the protective scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch device, comprising:
   a plurality of touch electrodes; and
   a touch circuit comprising a plurality of interfaces which are in one-to-one correspondence with the plurality of touch electrodes, wherein each of the plurality of touch electrodes is electrically connected to the corresponding one of the plurality of interfaces via a touch detection line,
   wherein the plurality of touch electrodes include first touch electrodes and second touch electrodes,
   each of the first touch electrodes is electrically connected to the corresponding one of the plurality of interfaces via a first switch, each of the second touch electrodes is electrically connected to the corresponding one of the plurality of interfaces via a second switch, and
   in a first work state, the first switches are turned on and the second switches are turned off, in a second work state, the first switches and the second switches are turned on, and a power consumption of the touch device in the first work state is less than that in the second work state.

2. The touch device of claim 1, wherein, at least one of the touch electrodes comprises at least two sub-electrodes electrically insulated from each other, and the at least two sub-electrodes are connected with the interface corresponding to the touch electrode by the touch detection line.

3. The touch device of claim 2, wherein, the at least one of the touch electrodes comprises two sub-electrodes electrically insulated from each other.

4. The touch device of claim 3, wherein, the two sub-electrodes of the touch electrode are arranged symmetrically.

5. The touch device of claim 4, wherein, the two sub-electrodes of the touch electrode are arranged diagonally.

6. The touch device of claim 3, wherein, one of the two sub-electrodes is completely enclosed by the other one of the two sub-electrodes.

7. The touch device of claim 2, wherein, a third switch is provided on the touch detection line corresponding to each of the at least two sub-electrodes.

8. The touch device of claim 2, wherein, a third switch is provided on the touch detection line corresponding to one of two sub-electrodes of each touch electrode.

9. The touch device of claim 2, wherein, the at least two sub-electrodes of each touch electrode are arranged in the same manner.

10. The touch device of claim 2, wherein, each of the first switches and each of the second switches is a thin film transistor.

11. The touch device of claim 1, wherein, the touch electrode is rectangular.

12. A driving method for the touch device of claim 1, comprising:
    determining whether the touch device is at the first work state or the second work state;
    if it is determined that the touch device is at the first work state, turning on the first switches and turning off the second switches, so that the touch circuit outputs the touch driving signal to first touch electrodes via the first switches; and
    if it is determined that the touch device is at the second work state, turning on the first switches and the second switches, so that the touch circuit outputs the touch driving signal to the first touch electrodes via the first switches and to second touch electrodes via the second switches.

13. The driving method of claim 12, wherein, the touch electrodes are divided from a common electrode, and the touch detection line is operable as a connection line to the common electrode;
    the driving method further comprising:
    in a third work state, turning on the first switches and the second switches, so that the touch circuit outputs a common voltage to the first touch electrodes via the first switches and to second touch electrodes via the second switches.

14. An array substrate, comprising a touch device,
    wherein the touch device comprises a plurality of touch electrodes and a touch circuit comprising a plurality of interfaces which are in one-to-one correspondence with the plurality of touch electrodes, wherein each of the plurality of touch electrodes is electrically connected to the corresponding one of the plurality of interfaces via a touch detection line, the plurality of touch electrodes of the touch device are divided from a common electrode of the array substrate,
    wherein the plurality of touch electrodes include first touch electrodes and second touch electrodes,
    each of the first touch electrodes is electrically connected to the corresponding one of the plurality of interfaces via a first switch, each of the second touch electrodes is electrically connected to the corresponding one of the plurality of interfaces via a second switch, and
    in a first work state, the first switches are turned on and the second switches are turned off, in a second work state, the first switches and the second switches are turned on, and a power consumption of the touch device in the first work state is less than that in the second work state.

15. The array substrate of claim 14, wherein, the touch detection line is operable as a connection line to the common electrode.

16. The array substrate of claim 14, wherein each of the first switches and each of the second switches is turned on when the common electrode operates in a display phase.

17. The array substrate of claim 14, wherein the first switches, the second switches, and thin film transistors in the array substrate for controlling orientation of liquid crystal are manufactured in the same manufacturing process.

18. A liquid crystal display panel, comprising:
a color filter substrate; and
an array substrate comprising a touch device,
wherein the touch device comprises a plurality of touch electrodes and a touch circuit comprising a plurality of interfaces which are in one-to-one correspondence with the plurality of touch electrodes,
wherein each of the plurality of touch electrodes is electrically connected to the corresponding one of the plurality of interfaces via a touch detection line, the plurality of touch electrodes of the touch device are divided from a common electrode of the array substrate,
wherein the plurality of touch electrodes include first touch electrodes and second touch electrodes,
each of the first touch electrodes is electrically connected to the corresponding one of the plurality of interfaces via a first switch, each of the second touch electrodes is electrically connected to the corresponding one of the plurality of interfaces via a second switch,
in a first work state, the first switches are turned on and the second switches are turned off, in a second work state, the first switches and the second switches are turned on, and a power consumption of the touch device in the first work state is less than that in the second work state.

19. The liquid crystal display panel of claim 18, wherein, an integrated circuit of the liquid crystal display panel is disposed in a non-display region of the liquid crystal display panel, and the integrated circuit is connected with the touch detection lines.

\* \* \* \* \*